US012724384B2

(12) United States Patent
Lin

(10) Patent No.: US 12,724,384 B2
(45) Date of Patent: Sep. 1, 2026

(54) LIGHT EMITTING WALL CLOCK

(71) Applicant: TSUEN JER ENTERPRISE CO., LTD., Taipei City (TW)

(72) Inventor: Cheng-Wei Lin, Taipei City (TW)

(73) Assignee: TSUEN JER ENTERPRISE CO., LTD., Taipei City (TW)

( * ) Notice: Subject to any disclaimer, the term of this patent is extended or adjusted under 35 U.S.C. 154(b) by 340 days.

(21) Appl. No.: 18/420,798

(22) Filed: Jan. 24, 2024

(65) Prior Publication Data

US 2025/0237997 A1 Jul. 24, 2025

(51) Int. Cl.
*G04B 19/30* (2006.01)

(52) U.S. Cl.
CPC .................................... *G04B 19/30* (2013.01)

(58) Field of Classification Search
CPC ..... G04B 19/30; G04B 19/305; G04G 9/0041
USPC ........................................................... 368/67
See application file for complete search history.

(56) References Cited

U.S. PATENT DOCUMENTS 4,250,575 A * 2/1981 Flumm .................. G04B 19/30 368/227
4,553,851 A * 11/1985 Matsumoto ............ G04C 10/02 368/203
5,984,485 A * 11/1999 Poli ...................... G02B 6/0055 362/625
6,452,872 B1 * 9/2002 Teijido ............... G02B 6/12002 353/38
7,054,233 B2 * 5/2006 Kibiloski ............. G04G 9/0041 368/227
2003/0231553 A1 * 12/2003 Kibiloski ............. G04G 9/0041 368/276
2004/0125585 A1 * 7/2004 Sung ...................... G04B 19/30 362/23.19
2005/0111239 A1 * 5/2005 Hosobuchi ........... G02B 6/0038 362/617
2009/0109801 A1 * 4/2009 Winkler ............... G04G 9/0041 368/227
2009/0185458 A1 * 7/2009 Harley, Jr. ............. G04B 19/30 368/203
2017/0357214 A1 * 12/2017 Choi ...................... G04B 37/14
2019/0086871 A1 * 3/2019 Okamura ............... G04B 19/32
2024/0210895 A1 * 6/2024 Miwa ................ G02F 1/133308

* cited by examiner

*Primary Examiner* — Sean Kayes

(57) ABSTRACT

A light emitting wall clock for solving the issue of overly high costs of a conventional light emitting wall clock. The light emitting wall clock includes a housing seat, having a front end and a rear end opposite to each other, the housing seat including an accommodating chamber formed at the front end; a time module, including a clock dial disposed at the accommodating chamber; a light guide cover, disposed at the accommodating chamber and covering the clock dial; and a light emitting module, disposed at the housing seat and including at least one light source, wherein a light emitting viewing angle of the light source covers the light guide cover.

10 Claims, 4 Drawing Sheets

LIGHT EMITTING WALL CLOCK

BACKGROUND OF THE INVENTION

1. Field of the Invention

The present disclosure relates to a clock, and in particular to a light emitting wall clock.

2. Description of the Related Art

A conventional light emitting wall clock substantially includes components such as an upper frame, a glass lens, a clock dial, a light guide lens, a chassis, a light stripe and a light sensor. The light guide lens is adhered above the chassis, and a washer is adhered to the light stripe and placed around and on the light guide lens. Accordingly, the conventional light guide wall clock can sense changes in the ambient light, so as to light up the clock dial by the light stripe in case of insufficient light, for a user to read the time at nighttime.

BRIEF SUMMARY OF THE INVENTION

However, the conventional light emitting wall clock includes numerous components, and thus suffers from problems of high manufacturing costs for molds, high material costs and a lengthy production time as well as complex and timing consuming subsequent assembly steps. As a result, the convention light emitting wall clock has a high selling price, in a way consumers may be forced to give up in purchasing the clock for that the selling price is over a budget although such product is quite appealing to consumers.

In view of the drawbacks above, the applicant has dedicated research and development to provide a light emitting wall clock with effectively reduced costs and hence a reduced selling price, so that the light emitting wall clock is affordable to more consumers who can then enjoy improved life quality.

The directional or similar terms used throughout the literature of the present disclosure, for example, “front”, “back/rear”, “left”, “right”, “up/upper/top”, “down/lower/bottom”, “in/inner”, “out/outer” and “side surface”, are primarily given with reference to the directions of the drawings. These directional or similar terms are intended to assist in describing and better understanding various embodiments of the present disclosure and are not to be construed as limitations to the present disclosure.

The articles “a/an” and “one” used for the elements and components described throughout the literature of the present disclosure are merely for the ease of use and to provide common meanings of the scope of the present disclosure, and should be interpret as “one” or “at least one” in the present disclosure. Moreover, the concept of a singular form also includes cases of plural forms, unless otherwise specified.

Similar terms including “join”, “combine”, “couple” or “assemble” used throughout the literature of the present disclosure primarily include forms which can be separated without sabotaging the components or contain inseparable components once connected, and can be selected by a person skilled in the art according to materials or assembly requirements of the components to be connected.

To achieve the above and other objects, a light emitting wall clock provided by the present disclosure includes: a housing seat, having a front end and a rear end opposite to each other, the housing seat including an accommodating chamber formed at the front end; a time module, including a clock dial disposed at the accommodating chamber; a light guide cover, disposed at the accommodating chamber and covering the clock dial; and a light emitting module, disposed at the housing seat and including at least one light source, wherein a light emitting viewing angle of the light source covers the light guide cover.

In the light emitting wall clock above, the light emitting viewing angle of the light source can cover the light guide cover and the clock dial.

In the light emitting wall clock above, the light emitting module includes a controller, a switch and a power unit. The light source, the switch and the power unit are all electrically connected to the controller. The controller, the switch and the power unit are individually assembled at the housing seat. The controller is located at the front end of the housing seat and is shielded by the clock dial, the switch protrudes from the rear end, and the power unit is located at the rear end.

In the light emitting wall clock above, the light emitting module includes a light sensor which can be electrically connected to the controller, and the clock dial can include a hole to expose the light sensor.

In the light emitting wall clock above, the housing seat can include an assembly chamber at the front end. The accommodating chamber can be in communication with the assembly chamber and can be located in front of the assembly chamber. The controller can be located at the assembly chamber.

In the light emitting wall clock above, the housing seat can include an inner surrounding wall and an abutting surface. The inner surrounding wall can be connected to the abutting surface to jointly form the accommodating chamber. The clock dial can abut against the abutting surface. The light guide cover can include a protection plate and a surrounding edge. The protection plate can be connected to the surrounding edge, the surrounding edge can be combined at the front end of the housing seat, and the protection plate can face the clock dial.

In the light emitting wall clock above, the light guide cover can include a plurality of first combining portions which can be located at the surrounding edge, the housing seat can include a plurality of second combining portions which can be disposed at the inner surrounding wall and/or the abutting surface, and the light guide cover can be combined at the plurality of second combining portions by the plurality of first combining portions.

In the light emitting wall clock above, each of first combining portions can be a protruding piece connected to the surrounding edge, each of the second combining portions can be a through hole for the protruding piece to pass through, and the light source can be aligned to be within a range of the first combining portions and face the first combining portions.

In the light emitting wall clock above, the housing seat can include at least one channel. The channel can be located at the abutting surface and can be in communication with the second combining portions and the assembly chamber, and the light source can be a light stripe and be accommodated in the channel.

In the light emitting wall clock above, the housing seat can include at least one installation slot formed at the rear end. The installation slot is recessed forward from the rear end and can be located in the assembly chamber, and the power unit can be assembled at the installation slot.

In the light emitting wall clock above, the time module can include a movement core and a pointer set. The pointer set can be located between the clock dial and the light guide cover, and the movement core can be assembled at the installation slot and can pass through to the front end of the housing seat so as to be connected to and drive the pointer set.

Accordingly, the light emitting wall clock of the present disclosure can integrate the conventional upper frame, washer and chassis into the housing seat, and integrate the conventional glass lens and light guide lens into the light guide cover, thereby reducing and simplifying the components of the overall light emitting wall clock and hence significantly reducing production costs, and more particularly for mold costs. Meanwhile, the production and manufacturing efficiency is also improved, and the simplified subsequent assembly steps also promote improved assembly efficiency. Thus, the present disclosure is capable of reducing the production costs of the overall light emitting wall clock to reflect the results on the selling price, that is, the selling price can be lowered. Consumers who could not afford expensive light emitting wall clocks can then afford the light emitting wall clock of the present disclosure to enjoy enhanced quality of life. In addition, boosting in a sale volume of the light emitting wall clock can also be promoted.

DETAILED DESCRIPTION OF THE INVENTION

To facilitate understanding of the object, characteristics and effects of this present disclosure, embodiments together with the attached drawings for the detailed description of the present disclosure are provided.

Figure 1:
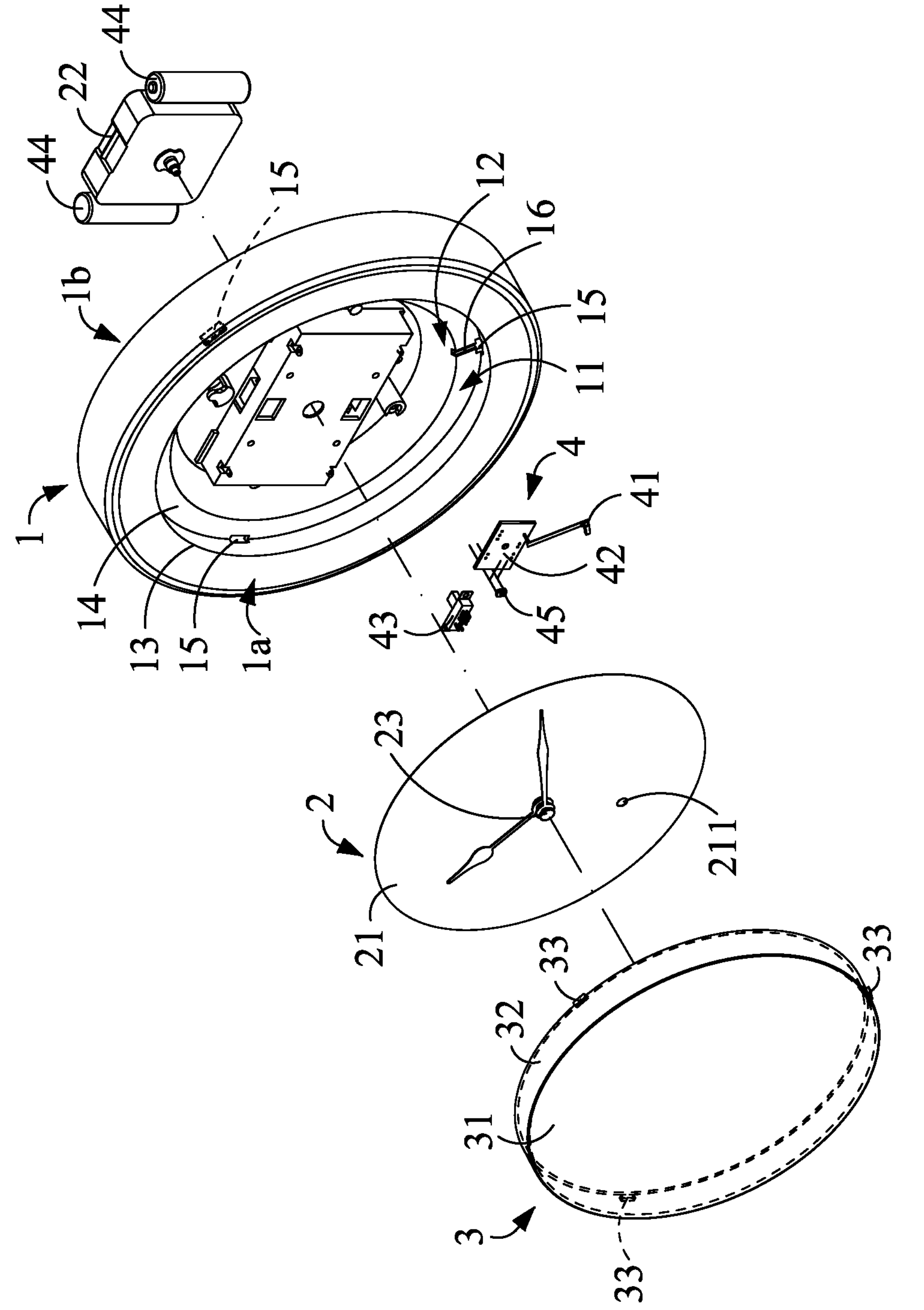
FIG. 1 is an exploded perspective schematic diagram according to an embodiment of the disclosure.
Figure 2:
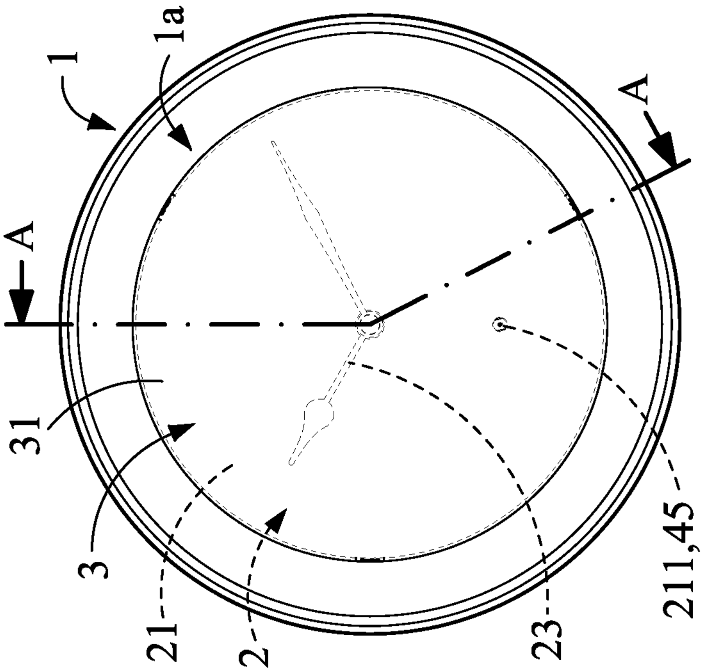
FIG. 2 is a front schematic diagram of an assembly according to an embodiment of the disclosure.
Figure 3:
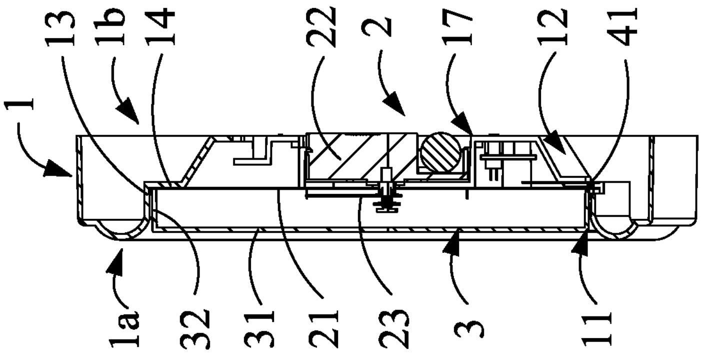
FIG. 3 is a section schematic diagram along the section line A-A in FIG. 2.

Refer to FIG. 1 to FIG. 3 showing a light emitting wall clock according to a preferred embodiment of the present disclosure. The light emitting wall clock includes a housing seat 1, a time module 2, a light guide cover 3 and a light emitting module 4. The time module 2, the light guide cover 3 and the light emitting module 4 are all disposed at the housing seat 1.

The housing seat 1 has a front end 1*a* and a rear end 1*b* opposite to each other. The housing seat 1 includes an accommodating chamber 11 formed at the front end 1*a*. A clock dial 21 of the time module 2 and the light guide cover 3 are both disposed at the accommodating chamber 11, and the light guide cover 3 covers the clock dial 21 and at the same time helps pressing against the clock dial 21. The clock dial 21 is configured to display time, and is implemented in a form of having only pointers, pointers coordinating with numbers and/or dials, or a digital time display. The light guide cover 3 can be formed of a light transmissive material, for example, acrylic (also referred to as acrylic plastic), polystyrene (PS) or acrylonitrile-styrene copolymer.

The light emitting module 4 is disposed at the housing seat 1, and includes at least one light source 41, wherein a light emitting viewing angle covers the light guide cover 3. Accordingly, light emitted from the light emitting source 41 is irradiated upon the light guide cover 3, and is diffused by the light guide cover 3 for reflection and extension of light beams, achieving the object of uniform lighting. Thus, when the light emitting wall clock is in an obscure or dark environment, the light beams emitted by the light source 41 can be uniformly irradiated on the clock dial 21 through the light guide cover 3, allowing a user to clearly see the clock dial 21 and thus read the time.

Moreover, the light emitting wall clock of the present disclosure can integrate the conventional upper frame, washer and chassis into the housing seat 1, and integrate the conventional glass lens and light guide lens into the light guide cover 3, thereby reducing and simplifying the components of the overall light emitting wall clock and hence significantly reducing production costs, and more particularly for mold costs. Meanwhile, the production and manufacturing efficiency is also improved, and the simplified subsequent assembly steps also promote improved assembly efficiency. Thus, the present disclosure is capable of reducing the production costs of the overall light emitting wall clock to reflect the results on the selling price, that is, the selling price can be lowered. Consumers who could not afford expensive light emitting wall clocks can then afford the light emitting wall clock of the present disclosure to enjoy enhanced quality of life. In addition, boosting in a sale volume of the light emitting wall clock can also be promoted.

In addition to the embodiments above, in one embodiment of the present disclosure, the light emitting viewing angle of the light source 41 can cover both the light guide cover 3 and the clock dial 21. As such, part of the light emitted by the light source 41 can directly illuminate the clock dial 21, so as to further enhance the clarity of the clock dial 21 in the dark.

Figure 4:
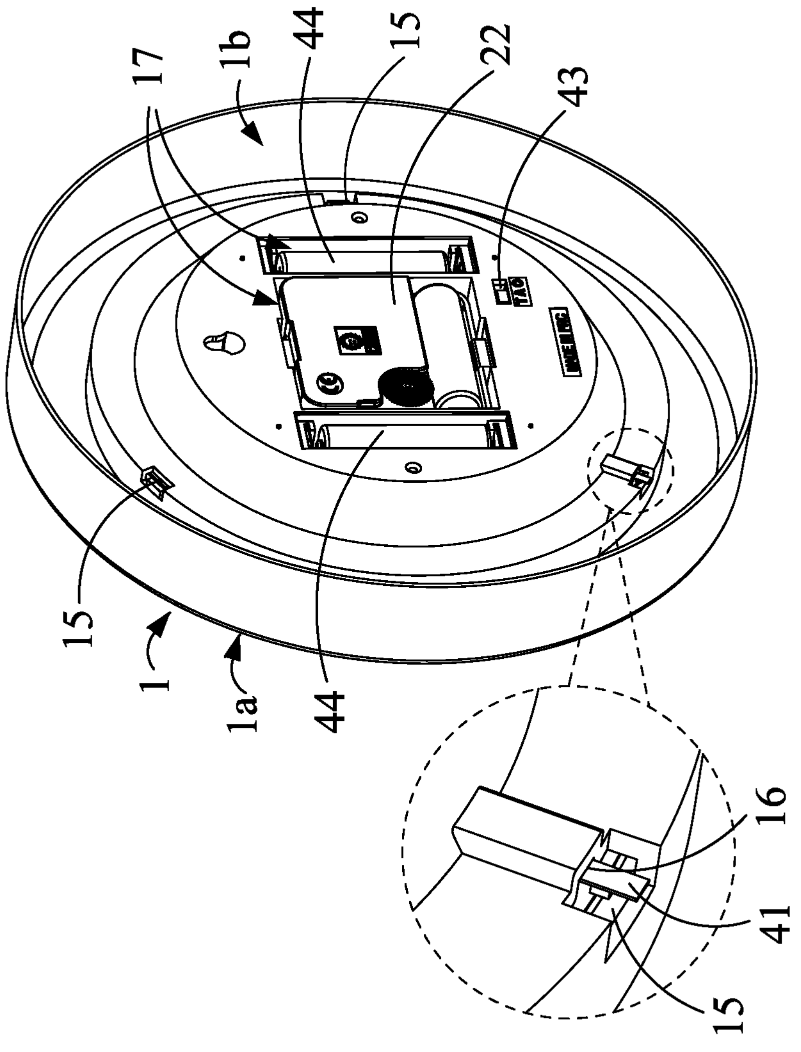
FIG. 4 is a perspective schematic diagram of an assembly from a rear view according to an embodiment of the disclosure.

Referring to FIG. 1, FIG. 3 and FIG. 4, in addition to the embodiments above, in one embodiment of the present disclosure, the light emitting module 4 can include a controller 42, a switch 43 and a power unit 44. The light source 41, the switch 43 and the power unit 44 are all electrically connected to the controller 42. The power unit 44 provides the light source 41 and the controller 42 electrical power needed for operation, and whether the electrical power to be provided by the power unit 41 can be controlled by the switch 43. When the switch 43 is turned on, the controller 42 can control the power unit 44 to output the electrical power to the light source 41 to enable the light source 41 to emit light. The controller 42, the switch 43 and the power unit 44 can be individually assembled at the housing seat 1. The controller 42 can be located at the front end 1*a* of the housing seat 1 and be shielded by the clock dial 21, and the switch 43 can protrude from the rear end 1*b* for a user to readily control and switch the switch 43. The power unit 44 can be located at the rear end 1*b* so as to be readily connected to an external power supply or perform battery replacement. In this embodiment, the power unit 44 can be, for example but not limited to, two battery cells. Thus, this embodiment allows the controller 42 to be protected and unlikely damaged, so that the switch 43 and the power unit 44 can be easily operated, used or replaced.

Referring to FIG. 1 and FIG. 2, in addition to the embodiments above, in one embodiment of the present disclosure, the light emitting module 4 can include a light sensor 45 which can be electrically connected to the controller 42, and the clock dial 21 can include a hole 211 to expose the light sensor 45. Thus, brightness of a located environment can be detected by the light sensor 45 of this embodiment. When the brightness is insufficient, the controller 42 can control the light source 41 to emit light, so the light emitting wall clock can automatically provide good visual recognition for a user to better correctly read the time. The controller 42, the switch 43 and the light sensor 45 can be disposed separately or be integrated on the same circuit board; such configuration is not specifically defined in the present disclosure.

Referring to FIG. 3 and FIG. 4, in addition to the embodiments above, in one embodiment of the present disclosure, the housing seat 1 can include an assembly chamber 12 at the front end 1*a*. The accommodating chamber 11 is in communication with the assembly chamber 12 and can be located in front of the assembly chamber 12. The controller 42 can be located at the assembly chamber 12. Thus, by providing a space for accommodating components such as the controller 42 by the assembly chamber 12 in this embodiment, interference of the components to the assembly of the clock dial 21 is prevented. Moreover, the components such as the controller 42 can be shielded behind the clock dial 21 and stay unexposed, so as to provide the light emitting wall clock with a simpler look for achieving effects such as enhancing the ease of assembly and quality of the appearance of the light emitting wall clock.

Referring to FIG. 1 and FIG. 3, in one embodiment of the present disclosure, the housing seat 1 can include an inner surrounding wall 13 and an abutting surface 14. The inner surrounding wall 13 is connected to the abutting surface 14, and the two jointly form the accommodating chamber 11. The clock dial 21 can abut against the abutting surface 14 so as to be securely disposed in the accommodating chamber 11. The light guide cover 3 can include a protection plate 31 and a surrounding edge 32. The protection plate 31 is connected to the surrounding edge 32. The light guide cover 3 can be combined at the front end 1*a* of the housing seat 1 by the surrounding edge 32, and the protection plate 31 faces the clock dial 21. Thus, the light guide cover 3 can substitute for a glass lens (or a transparent protection cover) and a light guide lens of a convention light emitting wall clock, so as to enhance the ease of installation of the clock dial 21 and to provide the light guide cover 3 with a protection function over the clock dial 21 at the same time.

Figure 5:
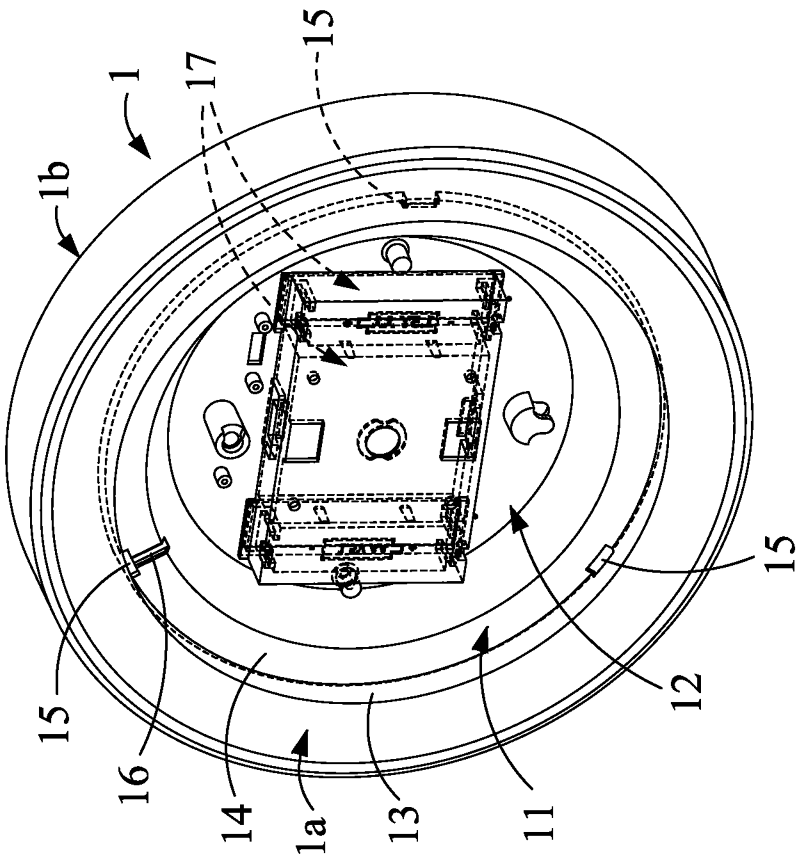
FIG. 5 is a perspective schematic diagram of a housing seat according to an embodiment of the disclosure.

Referring to FIG. 1, FIG. 3 and FIG. 5, in one embodiment of the present disclosure, the light guide cover 3 can include a plurality of first combining portions 33 which can be located at the surrounding edge 32. The housing seat 1 correspondingly includes a plurality of second combining portions 15 which can be disposed at the inner surround wall 13 and/or the abutting surface 14. Thus, the light guide cover 3 of this embodiment can be assembled at the plurality of second combining portions 15 by the plurality of first combining portions 33, so as to be kept in the accommodating chamber 11 without falling out, achieving a function of securely combining the light guide cover 3 and the housing seat 1.

For example, in one embodiment of the present disclosure, each of the first combining portions 33 can be a protruding piece connected to the surrounding edge 32, and each of the second connection portions 15 can be a through hole for the protruding piece to pass through. The light source 41 can be aligned within a range of the first combining portions 33 and face the first combining portions 33, such that light emitted by the light source 41 can be irradiated upon the first combining portions 33 of the light guide cover 3, so as to produce diffused and extended light beams through the light guide cover 3 to thereby generate a better effect of enhanced uniform light. Thus, with the simple structure of this embodiment, the second combining portions 15 can provide functions of both positioning the light guide cover 3 and providing the light source 41 with light transmissivity, achieving effects of enhanced ease of manufacturing and assembly. In addition, by aligning the light source 41 within the range of the first combining portions 33, a user is less likely to directly view light beams of the light source 41 from a front side of the light emitting wall clock to prevent a dazzling feel to the eyes, achieving an effect of enhance viewing comfort.

In one embodiment of the present disclosure, the housing seat 1 can further include at least one channel 16. The channel 16 can be located at the abutting surface 14 and can be in communication with the second combining portions 15 and the assembly chamber 12. The light source 41 can correspondingly be a light ribbon so as to be accommodated in the channel 16. Thus, this embodiment allows the light source 41 to be securely mounted at a predetermined position of the housing seat 1. It should be noted that, the position of the channel 16 is not limited by the present disclosure, and can be appropriately selected by a person of ordinary skill in the art according to a configuration relationship between the light source 41 and the component such as the controller 42, instead of being located in a direction of approximately five o'clock as disclosed in this embodiment. Moreover, LED light beads on the light ribbon usually have a light emitting viewing angle of more than 120 degrees. Thus, by adjusting a curvature of the light ribbon, the range covered by the light emitting viewing angle of the light source 41 can be easily controlled.

Referring to FIG. 1 to FIG. 4, in one embodiment of the present disclosure, the housing seat 1 can include at least one installation slot 17 formed at the rear end 1*b*. The installation slot 17 is recessed forward from the rear end 1*b* and can be located in the assembly chamber 12, and the power unit 14 is assembled at the installation slot 17. Thus, the space of the assembly camber 12 of this embodiment can be fully utilized, and a space for accommodating the components such as the power unit 44 can be provided by the installation slot 17. Thus, the thickness of the overall light emitting wall clock does not become too thick, interference of the components to the assembly of the clock dial 21 is prevented, and the power unit 44 can be exposed at the rear end 1*b* of the housing seat 1 to be readily connected to an external power supply or to perform battery replacement.

In one embodiment of the present disclosure, the time module 2 can include a movement core 22 and a pointer set 23. The pointer set 23 can be located between the clock dial 21 and the light guide cover 3, and the movement core 22 can be assembled at the installation slot 17 and can pass through to the front end 1*a* of the housing seat 1 so as to be connected to and drive the pointer set 23. For example, the number of the installation slot 17 of this embodiment can be three, wherein one of the installation slots 17 is for installing the movement core 22, and two battery cells of the power unit 44 are respectively installed in the other two installation slots 17. Thus, the space of the assembly camber 12 of this embodiment can be fully utilized, and a space for accommodating the movement core 22 can be provided by the installation slot 17. Thus, the thickness of the overall light emitting wall clock does not become too thick, and interference of the movement core 22 to the assembly of the clock dial 21 is prevented.

The present invention is described by way of the preferred embodiments above. A person skilled in the art should understand that, these embodiments are merely for describing the present invention are not to be construed as limitations to the scope of the present invention. It should be noted that all equivalent changes, replacements and substitutions made to the embodiments are to be encompassed within the scope of the present invention. Therefore, the scope of protection of the present invention should be accorded with the broadest interpretation of the appended claims.

What is claimed is:

1. A light emitting wall clock, comprising:
- a housing seat, having a front end and a rear end opposite to each other, the housing seat comprising an accommodating chamber formed at the front end;
- a time module, comprising a clock dial disposed at the accommodating chamber;
- a light guide cover, disposed at the accommodating chamber and covering the clock dial; and
- a light emitting module, disposed at the housing seat and comprising at least one light source, wherein a light emitting viewing angle covers the light guide cover,
- wherein the light emitting module comprises a controller, a switch and a power unit; the light source, the switch and the power unit are all electrically connected to the controller; the controller, the switch and the power unit are individually assembled at the housing seat; and the controller is located at the front end of the housing seat and is shielded by the clock dial, the switch protrudes from the rear end, and the power unit is located at the rear end.

2. The light emitting wall clock according to claim 1, wherein the light emitting viewing angle of the light source covers the light guide cover and the clock dial.

3. The light emitting wall clock according to claim 1, wherein the light emitting module comprises a light sensor which is electrically connected to the controller, and the clock dial comprises a hole to expose the light sensor.

4. The light emitting wall clock according to claim 1, wherein the housing seat comprises an assembly chamber formed at the front end, the accommodating chamber is in communication with the assembly chamber and is located in front of the assembly chamber, and the controller is located at the assembly chamber.

5. The light emitting wall clock according to claim 4, wherein the housing seat comprises an inner surrounding wall and an abutting surface, the inner surrounding wall is connected to the abutting surface to jointly form the accommodating chamber, the clock dial abuts against the abutting surface, the light guide cover comprises a protection plate and a surrounding edge, the protection plate is connected to the surrounding edge, the surrounding edge is combined at the front end of the housing seat, and the protection plate faces the clock dial.

6. The light emitting wall clock according to claim 5, wherein the light guide cover comprises a plurality of first combining portions which are located at the surrounding edge, the housing seat comprises a plurality of second combining portions which are disposed at the inner surrounding wall and/or the abutting surface, and the light guide cover is combined at the plurality of second combining portions by the plurality of first combining portions.

7. The light emitting wall clock according to claim 6, wherein each of first combining portions is a protruding piece connected to the surrounding edge, each of the second combining portions is a through hole for the protruding piece to pass through, and the light source is aligned to be within a range of the first combining portion and faces the first combining portion.

8. The light emitting wall clock according to claim 7, wherein the housing seat comprises at least one channel, the channel is located at the abutting surface and is in communication with the second combining portions and the assembly chamber, and the light source is a light ribbon and is accommodated in the channel.

9. The light emitting wall clock according to claim 4, wherein the housing seat comprises at least one installation slot formed at the rear end, the installation slot is recessed forward from the rear end and is located in the assembly chamber, and the power unit is assembled at the installation slot.

10. The light emitting wall clock according to claim 9, wherein the time module comprises a movement core and a pointer set, the pointer set is located between the clock dial and the light guide cover, and the movement core is assembled at the installation slot and passes through to the front end of the housing seat so as to be connected to and drive the pointer set.

* * * * *